United States Patent
Bailleul

(10) Patent No.: US 6,201,844 B1
(45) Date of Patent: Mar. 13, 2001

(54) TRANSCODING OF A DATA STREAM

(75) Inventor: Nicolas Bailleul, Paris (FR)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/300,804

(22) Filed: Apr. 27, 1999

(30) Foreign Application Priority Data

Apr. 30, 1998 (EP) .................................. 98401053

(51) Int. Cl.⁷ ....................................... H04L 7/00
(52) U.S. Cl. ................................. 375/372; 375/377
(58) Field of Search .................... 375/242, 244, 375/245, 372, 377; 348/409, 410, 500, 409.1, 410.1; 341/51, 61

(56) References Cited

U.S. PATENT DOCUMENTS

| | | | |
|---|---|---|---|
| 4,782,326 | * 11/1988 | Bush | 341/76 |
| 5,534,937 | * 7/1996 | Zhu et al. | 348/466 |
| 5,621,775 | * 4/1997 | Etienne | 375/372 |
| 5,764,298 | * 6/1998 | Morrison | 348/500 |
| 5,870,146 | * 2/1999 | Zhu | 348/409 |

* cited by examiner

Primary Examiner—Tesfaldet Bogure
(74) Attorney, Agent, or Firm—Russell Gross

(57) ABSTRACT

A data stream (DS) comprises a time multiplex of coded data (D) and control data (C). The data stream (DS) may be, for example, of the MPEG type representing a sequence of pictures. The coded data (D) is transcoded (T) so as to obtain transcoded data (DT) which differs in size from the coded data (D). The control data (C) is adapted for the transcoded data (DT) so as to obtain adapted control data (CA) which does not substantially differ in size from the control data (C). The transcoded data (DT) and the adapted control data (CA) are written into a transcoder output buffer (TOB) and read from the transcoder output buffer (TOB) so as to obtain a transcoded data stream (DST). This allows an efficient use of a transmission channel via which the transcoded data stream (DST) is to be transmitted and, consequently, it allows a satisfactory transcoding quality. A size adjustment of the transcoded data (DT) on the basis of the amount of data contained in the transcoder output buffer (TOB) and control codes (CC) contained in the data stream (DS) further contributes to a satisfactory transcoding quality.

5 Claims, 7 Drawing Sheets

TRANSCODING OF A DATA STREAM

FIELD OF THE INVENTION

The invention relates to transcoding of a data stream comprising a time multiplex of coded data and control data. The data stream may represent, for example, a sequence of images which have been coded in accordance with an image-coding standard such as, for example, defined by the Moving Pictures Experts Group (MPEG).

BACKGROUND ART

EP-A 0 690 392 describes a method of transcoding coded digital signals corresponding to a sequence of images. The method comprises a decoding step of the input digital signals which are associated with each current image. The decoding step is followed by an encoding step.

SUMMARY OF THE INVENTION

It is an object of the invention to provide transcoding of a data stream which yields a satisfactory quality. Claims 1, 7 and 8 define a method of transcoding, a transcoder, and a transcoded data stream, respectively, in accordance with the invention.

The invention takes the following aspects into consideration. A data stream may not only comprise coded data, but also control data. In transcoding, the data stream will effectively be split up into a coded data sub-stream and a control data sub-stream. The coded data sub-stream is transcoded, resulting in a transcoded data sub-stream. It may be necessary to adapt the control data for the transcoded data. In that case, the control data sub-stream is effectively transformed into an adapted control data sub-stream. The transcoded data sub-stream stream and the adapted control data sub-stream may be combined so as to obtain a transcoded data stream which is a different representation of data originally contained in the coded data stream.

Some coding standards, such as, for example, MPEG image-coding standards do not fix the size of the coded data but implicitly fix the size of the control data. In such a coding standard, coded data may be decoded and re-coded so as to obtain transcoded data which may differ in size from the coded data. However, it is not possible to do the same for the control data without departing from the coding standard. If the data stream has to be transcoded while maintaining conformity with its coding standard, one may adapt the content of the control data but not its size. As a result, the transcoded data sub-stream and the adapted control data sub-stream will have different bit rates.

In accordance with the invention, the transcoded data and the adapted control data are written into a transcoder output buffer and read from the transcoder output buffer so as to obtain a transcoded data stream. Accordingly, any difference in bit rate between the transcoded data sub-stream and the control data sub-stream can be averaged out in such a way that the transcoded data stream has a bit rate which is substantially constant or, at least, which does not substantially depend on whether coded data or control data is conveyed. Thus, the invention allows the bit rate of the transcoded data stream to be continuously equal to a maximum bit rate which a certain transmission channel can handle or, at least, relatively close thereto. Consequently, since the invention allows an efficient use of the transmission channel via which the transcoded data stream is transmitted, it allows the transcoded data to have a relatively large size. Accordingly, the invention ensures that a maximal amount of data is preserved in the transcoding. Thus, the invention allows transcoding with a satisfactory quality.

The invention and additional features, which may be optionally used to implement the invention to advantage, are apparent from and will be elucidated with reference to the drawings described hereinafter.

DETAILED DESCRIPTION OF THE DRAWINGS

First, some remarks will be made on the use of reference signs. Similar entities are denoted by an identical letter code throughout the drawings. In a single drawing, various similar entities may be shown. In that case, a numeral is added to the letter code to distinguish similar entities from each other. The numeral will be between parentheses if the number of similar entities is a running parameter. In the description and the claims, any numeral in a reference sign may be omitted if this is appropriate.

Figure 1:
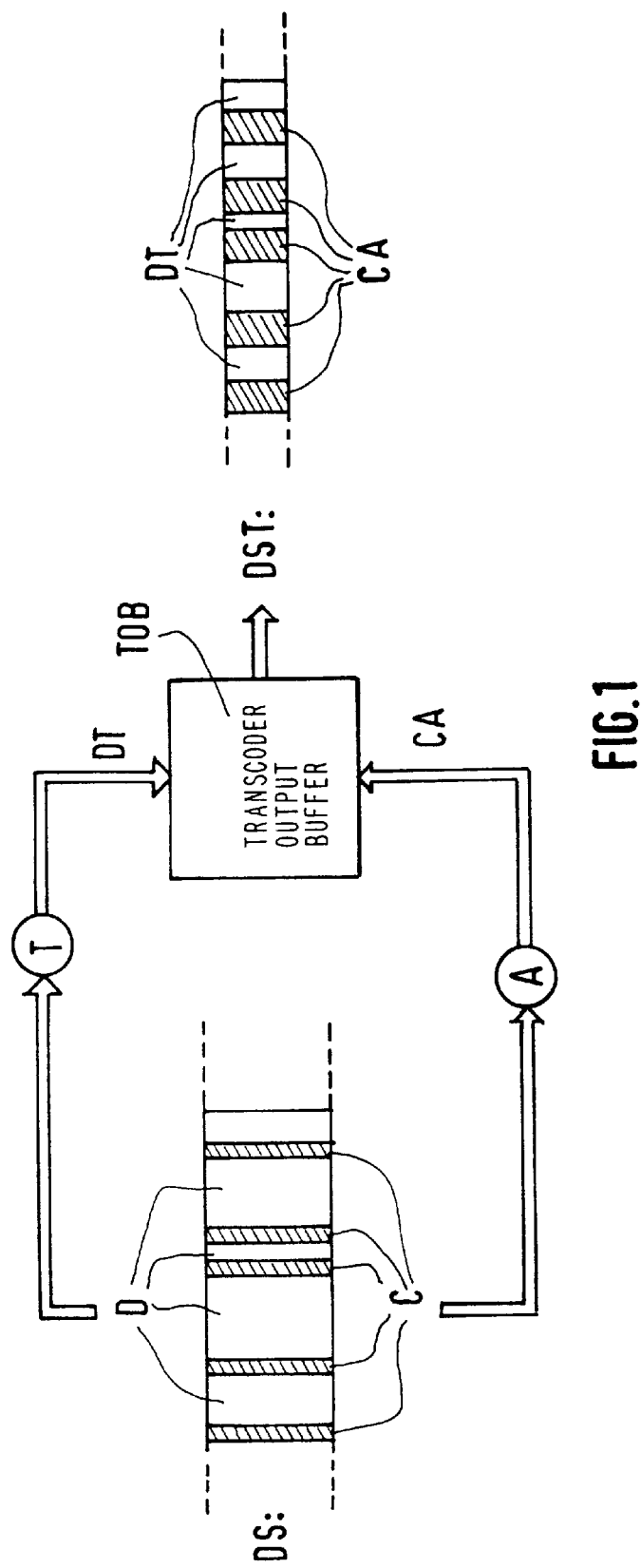
FIG. 1 is a conceptual diagram illustrating basic features of the invention as claimed in claim 1.

FIG. 1 illustrates basic features of the invention. A data stream DS to be transcoded comprises a time multiplex of coded data D and control data C. The coded data D is transcoded T so as to obtain transcoded data DT. The transcoded data DT differs in size from the coded data D. The control data C is adapted A for the transcoded data DT so to obtain adapted control data CA. The adapted control data CA and the control data C are substantially equal in size. The transcoded data DT and the adapted control data CA are written into and read from a transcoder output buffer TOB so as to obtain a transcoded data stream DST.

Figure 2:
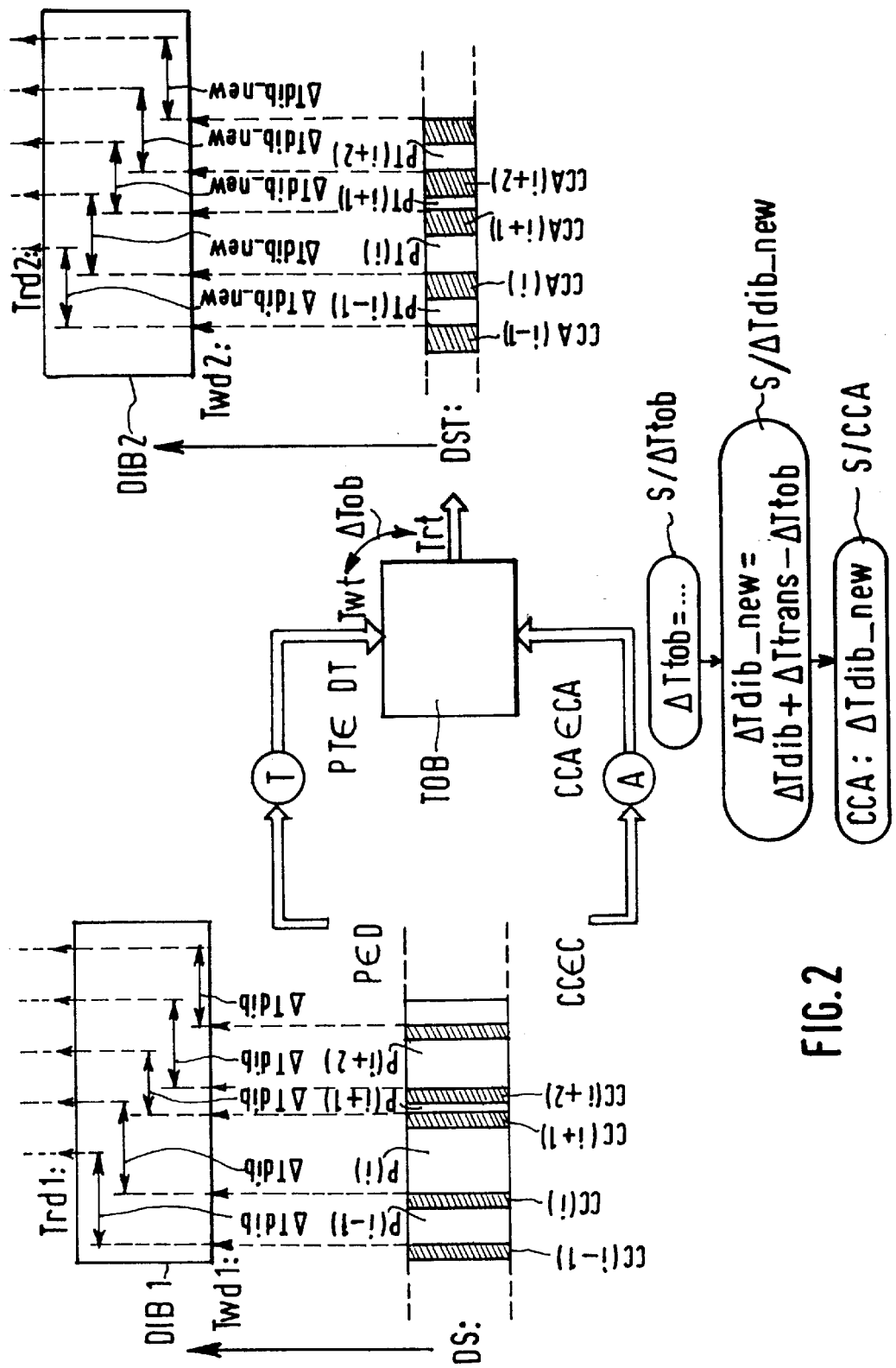
FIGS. 2 to 6 are conceptual diagrams illustrating additional features as claimed in claims 2 to 5, respectively.

FIG. 2 illustrates the following feature in addition to the features which have been discussed with reference to FIG. 1. The data stream DS comprises control codes CC. A control code defines a decoder input buffer delay $\Delta Tdib$ for a coded data portion P associated therewith. The decoder input buffer delay $\Delta Tdib$ is the difference between an instant Twd1 when the coded data portion P is written into a decoder input buffer DIB1 and an instant Trd1 when the coded data portion P is to be read from the decoder input buffer DIB1. In a step S/$\Delta Ttob$, a transcoder output buffer delay $\Delta Ttob$ is calculated. The transcoder output buffer delay $\Delta Ttob$ is the difference between an instant Twt when a transcoded data portion PT obtained by transcoding the coded data portion P is written into the transcoder output buffer TOB and an instant Trt when the transcoded data portion PT is read from transcoder output buffer TOB. In a step S/$\Delta Tdib\_new$, a new decoder input buffer delay $\Delta Tdib\_new$ is calculated. The new decoder input buffer delay $\Delta Tdib\_new$ is substantially equal to the sum of the decoder input buffer delay $\Delta Tdib$ and a transcoding delay $\Delta Ttrans$ minus the transcoder output buffer delay $\Delta Ttob$. In a step S/CCA, an adapted control code CCA is provided for the transcoded data portion PT, the adapted control code CCA defining the new decoder input buffer delay $\Delta Tdib\_new$.

The following aspects have been taken into consideration with regard to the features illustrated in FIG. 2. The control codes CC effectively determine a time pattern in accordance with which the data portions P will be read out from the decoder input buffer DIB1 at the decoding end receiving the data stream DS. In many applications, it will be desirable that the transcoded data portions PT are read out in accordance with the same time pattern from a decoder input buffer DIB2 at the decoding end receiving the transcoded data stream DST.

In principle, it is possible to simply copy the control codes CC from the data stream DS to the transcoded data stream DST. That is, the decoder input buffer delay $\Delta$Tdib which is used for a data portion P can also be used for a transcoded data portion PT obtained by transcoding the data portion P. However, if this is done, the transcoded data portions PT will be read out in accordance with the same time pattern as the coded data portions P only if the following condition is satisfied. In the transcoded data stream DST, the transcoded data portions PT should be positioned with respect to each other in exactly the same manner as in the coded data portions P in the data stream DS. This implies that each transcoded data portion PT should have a specific size. In the process of transcoding, it may be relatively difficult, and hence costly, to guarantee that each transcoded data portion PT has the required size, or it may even be impossible to guarantee this. Furthermore, in order to satisfy this condition, it may happen that one or more transcoded data portions should have a relatively small size. Accordingly, in the process of transcoding to obtain such a small-size transcoded data portion, a relatively large amount of information may be lost. This may adversely affect the quality of data obtained by decoding the transcoded data stream DST.

The features illustrated in FIG. 2 provide the following advantageous effects. The new decoder input buffer delay $\Delta$Tdib__new is the difference between an instant Twd2 when the transcoded data portion PT is written into a decoder input buffer DIB2 and an instant Trd2 when the transcoded data portion PT is to be read from the decoder input buffer DIB2. Let it be assumed that the decoder input buffer DIB2 is directly coupled to the transcoder output buffer TOB. In that case, the difference between the instant the coded data portion P is written into the transcoder output buffer TOB and the instant when the transcoded data portion PT is read from the decoder input buffer DIB will be substantially equal to the sum of the decoder input buffer delay $\Delta$Tdib and the fixed transcoding delay $\Delta$Ttrans. Consequently, the difference between the instant when the transcoded data portion PT is read from the decoder input memory DIB2 and the instant when the coded data portion P is read from the decoder input memory DIB1 is substantially equal to the fixed transcoding delay $\Delta$Ttrans. Thus, the transcoded data portions PT are read out from the decoder input buffer DIB2 in accordance with the same time pattern as the coded data portions P are read out from the decoder input buffer DIB1. This equally applies if the transcoded data portions PT reach the decoder input buffer DIB a certain transmission delay $\Delta$Ttd after they have been read from the transcoder output buffer TOB. Thus, the features illustrated in FIG. 2 allow the transcoded data portions PT to be read out in accordance with a desired time pattern without constraining the transcoded data portions PT in size, which may entail relatively high costs and adversely affect quality as explained hereinbefore. Thus, the features illustrated in FIG. 2 contribute to relatively cost-efficient implementations and a satisfactory quality.

The following additional remarks are made with regard to the features illustrated in FIG. 2. The transcoder output delay $\Delta$Ttob may be calculated in various different manners. For example, it may be calculated on the basis of the following parameters: (a) the amount of data which is contained in the transcoder output buffer TOB at the instant when a transcoded data portion PT is written into this buffer, and (b) the rate at which data will be read from this buffer. The amount of data contained in the transcoder buffer may be determined, for example, by counting the amount of data which has been written into the transcoder output buffer TOB and has been read from it. The rate at which data will be read from the transcoder output buffer TOB is the bit rate of the transcoded data stream DST which may be, for example, determined by a controller. The following is an example of a calculation of the transcoder output delay $\Delta$Ttob for a certain transcoded data portion PT. Let it be assumed that the transcoder output buffer TOB contains 500 kbits at the instant when the transcoded data portion PT is written into the transcoder output buffer TOB and that the bit rate of the transcoded data stream DST is 5 Mbits per second. It can then easily be calculated that the transcoded data portion will be read from the transcoder output buffer TOB after a delay of 100 ms, thus the transcoder output buffer delay $\Delta$Ttob for the data portion is 100 mS. However, the transcoder output delay $\Delta$Ttob may also be calculated by measuring the instant when the transcoded data portion PT is written into the transcoder output buffer TOB and the instant when the transcoded data portion is read from this buffer. In that case, the transcoded data stream DST may be additionally delayed at the transcoding end so as to allow the control code CC to be adapted in a retro-active manner.

The fixed transcoding delay $\Delta$Ttrans should preferably be equal to or greater than the delay actually introduced by the process of transcoding. The fixed transcoding delay $\Delta$Ttrans involves a compromise between picture quality and the total delay between the transmission end and the receiving end. That is, if the fixed transcoding delay $\Delta$Ttrans has a relatively large value, this will contribute to the picture quality. However, a relatively large value may not be satisfactory if there is a live transmission of a football match for example.

Further additional features which may be optionally used to implement the invention to advantage are illustrated in FIGS. 3, 4, 5 and 6. Each of these Figures includes a graph having a horizontal axis representing time T and a vertical axis representing the amount of data X. Each graph comprises three curves A, B and C. Curve A represents the amount of data which has been written into the transcoder output buffer TOB as a function of time. Curve B represents the amount of data which has been removed from the decoder output buffer TOB and has subsequently been written into the decoder input buffer DIB at the decoding end. Curve C represents the amount of data which has been read from the decoder input buffer TOB as a function of time. The transcoder output buffer TOB contains an amount of data which, at any instant, is the difference between the curves A and B at this instant. The decoder input buffer DIB contains an amount of data which, at any instant, is the difference between the curves B and C at this instant.

Figure 3:
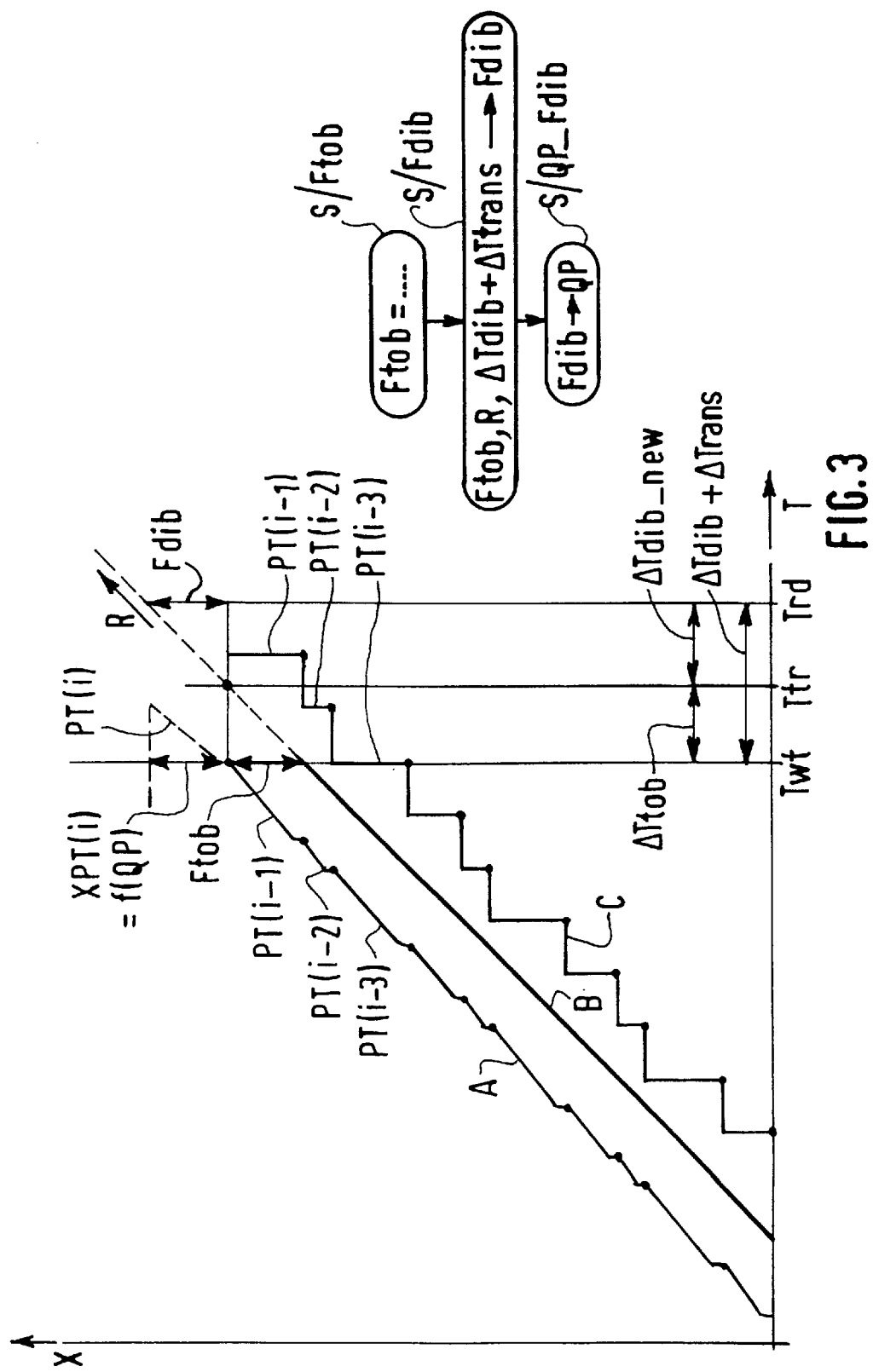

FIG. 3 illustrates the following feature in addition to the features which have been discussed with reference to FIG. 2. In a step S/Ftob, a transcoder output buffer fullness Ftob is determined. The transcoder output buffer fullness Ftob is the amount of data A-B contained in the transcoder output buffer TOB at the instant Twt when the transcoded data portion PT(i) is written into the transcoder output buffer TOB. In a step S/Fdib, a decoder input buffer fullness Fdib is calculated. The decoder input buffer fullness Fdib is the amount of data B-C which will be contained in a decoder input buffer receiving the transcoded data stream DST at an instant Trd when the transcoded coded data portion PT(i) is to be read from decoder input buffer DIB. The decoder input buffer fullness Fdib is determined on the basis of the transcoder output buffer fullness Ftob, a projected bit rate R for the transcoded data stream DST, and the sum of the decoder input buffer delay ΔTdib and the transcoding delay ΔTtrans. In a step S/QP-Fdib, a quantization parameter QP determining the amount of data XPT(i), which will be comprised in the transcoded data portion PT, is adjusted in dependence on the decoder input buffer fullness Fdib.

With regard to the features illustrated in FIG. 3, the following aspects have been taken into consideration. If, within a certain period of time, the amount of data read from the decoder input buffer DIB exceeds the amount of data written into this buffer, there is a risk that this buffer will underflow. That is, at an instant when a certain transcoded data portion is to be read from the decoder input buffer DIB, the transcoded data portion may not have been fully written into this buffer yet. Conversely, if within a certain period of time, the amount of data written into the decoder input buffer DIB exceeds the amount of data read from this buffer, there is a risk that this buffer will overflow. That is, at an instant when a certain transcoded data portion reaches the decoder input buffer DIB, there may not be sufficient room left in this buffer DIB for storing the transcoded data portion. In any case, an underflow or overflow will generally entail a certain loss of transcoded data available for the decoding process. This may cause annoying effects at the decoding end.

The features illustrated in FIG. 3 provide the following advantageous effects. The amount of data XPT(i) contained in the transcoded data portion PT(i) will depend on the decoder buffer fullness Fdib. That is, the amount of data XPT(i) contained in the transcoded data portion PT(i) will depend on the amount of data contained in the decoder input buffer DIB at the instant Trd when the transcoded data portion PT(i) will be read from this buffer. This prevents underflow or overflow of the decoder input buffer DIB. For example, let it be assumed that the decoder input buffer DIB is calculated to be relatively full. In that case, the quantization parameter QP can be set to such a value that the transcoded data portion PT(i) comprises a relatively large amount of data XPT(i) in order to avoid overflow. Conversely, if the decoder input buffer DIB is calculated to be relatively empty, the quantization parameter QP can be set to such a value that the transcoded data portion PT comprises a relatively small amount of data XPT(i) in order to avoid underflow. Thus, since the features illustrated in FIG. 3 allow countering of underflow and overflow, these features contribute to a satisfactory quality of data obtained at the decoding end.

Figure 4:
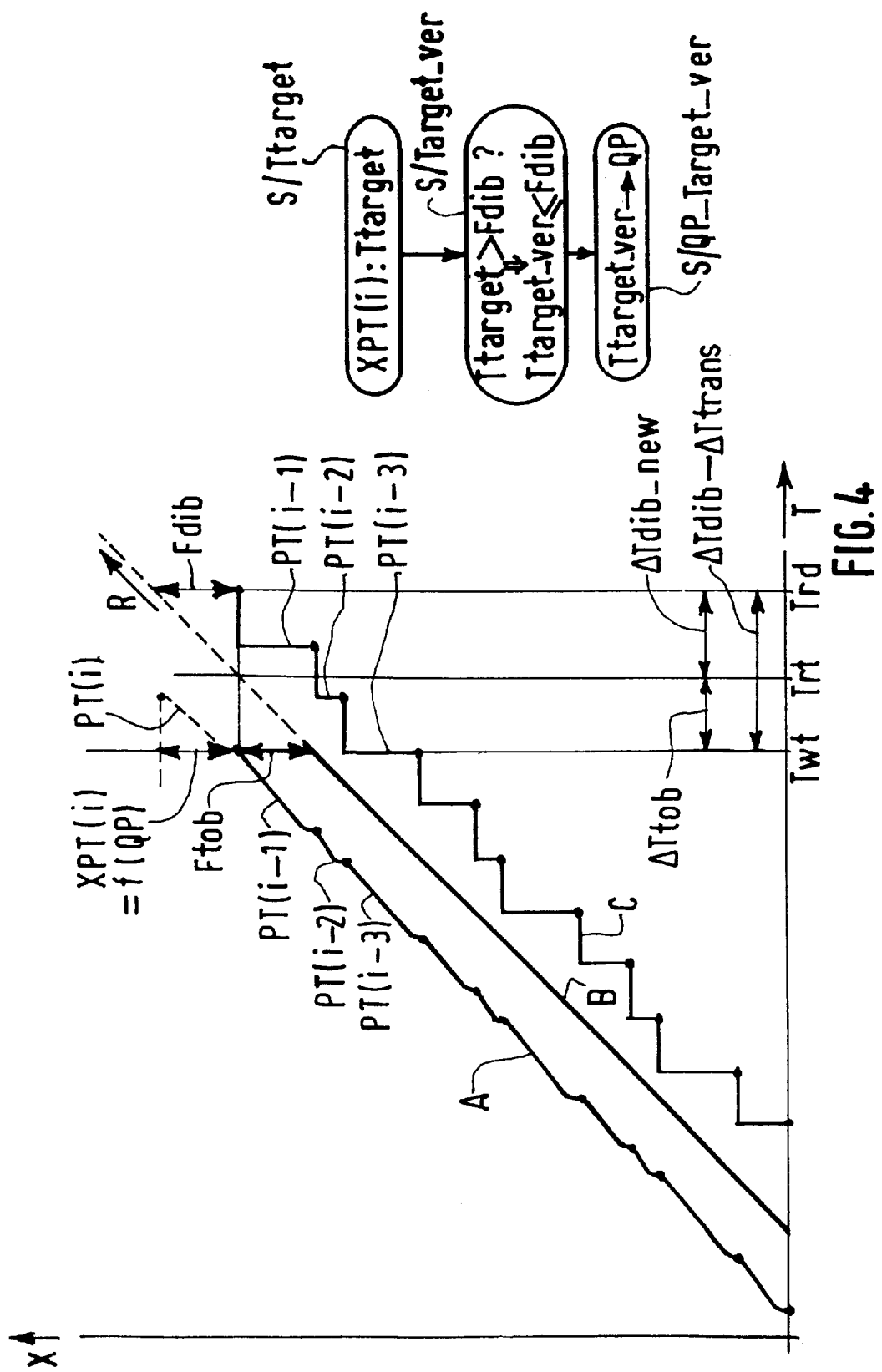

With regard to the features illustrated in FIG. 3, the following additional remarks are made. The decoder input buffer fullness Fdib can be calculated in various manners. For example, it may be calculated by first calculating which amount of data DX will be transferred from the transcoder output buffer TOB to the decoder input buffer DIB in a time interval which begins at the instant Twt when the transcoded data portion PT is written into the transcoder output buffer and has a length which is equal to the sum of the decoder input buffer delay ΔTdib and the transcoding delay ΔTtrans. The graph included in FIG. 4 illustrates that the following law applies: the amount of data DX is equal to the sum of the transcoder input buffer fullness Ftob and the decoder input buffer Fdib. Thus, the decoder input buffer fullness Fdib is the difference between the amount of data DX and the transcoder output buffer fullness Ftob. Another manner of calculating the decoder input buffer fullness Fdib is to make use of the new decoder input buffer delay ΔTdib_new calculated as explained with reference to FIG. 2. The decoder input buffer fullness Fdib is the amount of data which will be transferred from the transcoder output buffer TOB to the decoder input buffer DIB in a time interval which begins at the instant Trt when the transcoded data portion PT will be read from the transcoder output buffer TOB and has a length which is equal to the new decoder input buffer delay ΔTdib_new.

FIG. 4 illustrates the following features in addition to the features which have been discussed with reference to FIG. 3. In a step S/Ttarget, a target Ttarget is determined for the amount of data XPT(i) to be comprised in the transcoded data portion PT(i). In a step S/Ttarget_ver, it is verified if the target Ttarget exceeds the input decoder buffer fullness Fdib. If so, the target Ttarget is reduced so as to obtain a verified target Ttarget_ver which does not exceed the decoder input buffer fullness Fdib. In a step S/QP-Ttarget_ver, the quantization parameter QP is adjusted on the basis of the verified target Ttarget_ver.

With regard to the features illustrated in FIG. 4, the following aspects have been taken into consideration. Firstly, the following scenario should be taken into account with regard to underflow. At the decoding end, the transcoded data portion PT(i) is immediately removed from the decoder input buffer DIB at the instant Trd determined by the new decoder input buffer delay ΔTdib_new discussed hereinbefore. If Ttarget exceeds the decoder input buffer fullness Fdib, this may result in underflow. That is, there is a risk that the transcoded data portion PT(i), which should be present in the decoder input buffer DIB, is only partially present or, in the worst case, is not present at all.

Secondly, there may be criteria other than decoder input buffer fullness Fdib to adjust the quantization parameter QP. For example, the data stream to be transcoded may comprise coded data portions which are relatively small in size and data portions which are relatively large in size. In general, a satisfactory transcoding quality will be obtained if the relatively large coded data portions are also transcoded into relatively large transcoded data portions. Relatively small coded data portions are preferably transcoded into relatively small transcoded data portions so as to effectively leave sufficient room for the relatively large transcoded data portions. Thus, in order to achieve a satisfactory transcoding result, it may be desirable to adjust the quantization parameter QP in dependence on which the amount of data contained in coded data portions is to be transcoded.

The features illustrated in FIG. 4 provide the following advantageous effects. The quantization parameter QP is directly influenced by the decoder input buffer fullness Fdib only if the target Ttarget exceeds the decoder buffer input fullness Fdib. That is, the quantization parameter QP is directly influenced by the decoder input buffer fullness Fdib only if there is a serious risk of underflow. However, if there is little risk of underflow, the quantization parameter QP is adjusted on the basis of the target Ttarget as originally defined. The target Ttarget may be defined in such a manner that a satisfactory transcoding quality is achieved. For example, it may be defined on the basis of the size of the coded data portion as discussed hereinbefore. The verification of the target Ttarget is effectively a safeguard which, in principle, should not come into action too often. Thus by allowing the quantization parameter QP to be primarily adjusted on the basis of one or more parameters other than decoder input buffer fullness Fdib while providing a safeguard against underflow, the features illustrated in FIG. 4 contribute to a satisfactory transcoding quality.

Figure 5:
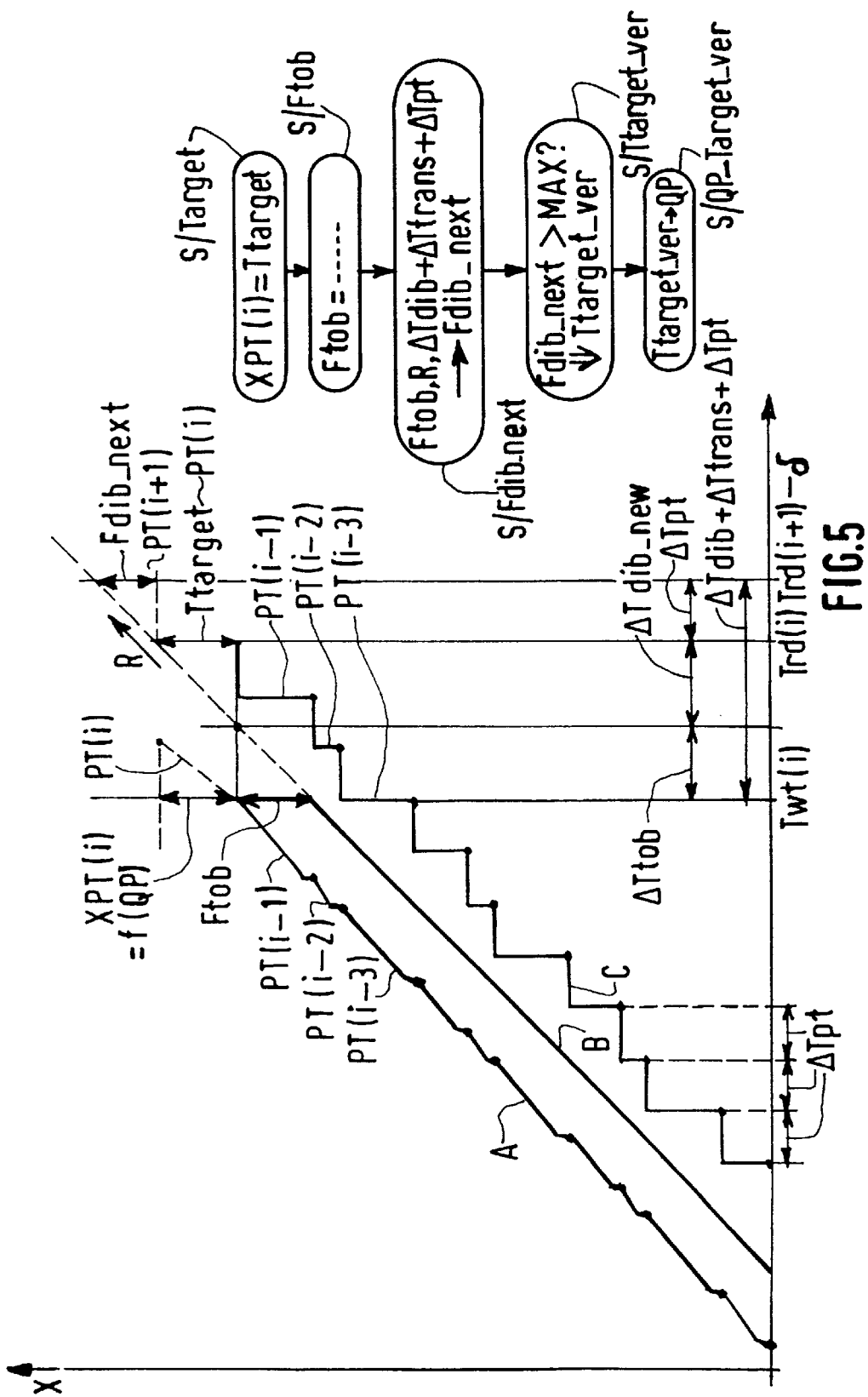

FIG. 5 illustrates the following features in addition to the features which have been discussed with reference to FIG.

2. There is a fixed time interval ΔTpt between instants when successive transcoded data portions PT are to be read from a decoder input buffer receiving the transcoded data stream. In a step S/Ttarget, a target Ttarget is determined for the amount of data XPT(i) to be comprised in the transcoded data portion PT(i). In a step S/Ftob, a transcoder output buffer fullness Ftob is determined. The transcoder output buffer fullness Ftob is the amount of data A-B contained in the transcoder output buffer TOB at the instant Twt(i) when the transcoded data portion PT(i) is written into the transcoder output buffer TOB. In a step S/Fdib_next, a subsequent decoder input buffer fullness Fdib_next is calculated. The next decoder input buffer fullness Fdib is the amount of data B-C which will be contained in the decoder input buffer DIB at an instant Trd(i+1)–δ just before a subsequent transcoded coded data portion PT(i+1) is to be read from the decoder input buffer DIB. The next decoder input buffer fullness Fdib_next is calculated on the basis of the transcoder buffer fullness Ftob, a projected bit-rate R for the transcoded data stream, and the sum of the decoder input buffer delay ΔTdib, the transcoding delay ΔTtrans and the fixed time interval ΔTpt. In a step S/Ttarget_ver, it is verified if the next decoder input buffer fullness Fdib_next exceeds a predefined maximum MAX. If so, the target Ttarget is increased so as to obtain a verified target Ttarget ver for which the next decoder input buffer fullness Fdib_next does not exceed the predefined maximum MAX. In a step S/QP-Target_ver, the quantization parameter QP is adjusted on the basis of the verified target Ttarget_ver.

With regard to the features illustrated in FIG. 5, aspects have been taken into consideration which are similar to those with regard to the features illustrated in FIGS. 3 and 4. Other considerations are as follows. The transcoded data portion PT(i) may contain an amount of data XPT(i) which is smaller than the amount of data which will be written into the decoder input buffer DIB during the fixed time interval ΔTpt between the instant Trd(i) and Trd(i+1)–δ. In that case, the amount of data contained in the decoder input buffer DIB will grow during that time interval. There may be an overflow if the decoder input buffer DIB is already filled with an appreciable amount of data and if the transcoded data portion PT(i) contains a relatively small amount of data XPT(i).

The features illustrated in FIG. 5 provide the following advantageous effects. The next decoder input buffer fullness Fdib_next is effectively a prediction of the amount of data which will be contained in the decoder input buffer DIB at the instant Trd(i+1)–δ just before the next transcoded data portion PT(i+1) are read from the decoder output buffer. This prediction is made on the basis of the target Ttarget which has initially been determined. It is verified if the predicted amount of data in the decoder input buffer DIB at the instant Trd(i+1)–δ is below the desired maximum MAX. That is, it is verified if overflow is likely to occur or not for the target Ttarget initially determined. If overflow is likely to occur, the target Ttarget is sufficiently increased so that overflow is no longer likely to occur. Thus, the features illustrated in FIG. 5 provide a safeguard against an overflow of the decoder input buffer which may otherwise occur. Other advantages related to these features are similar to the advantages mentioned hereinbefore in connection with the features illustrated in FIGS. 3 and 4.

Figure 6:
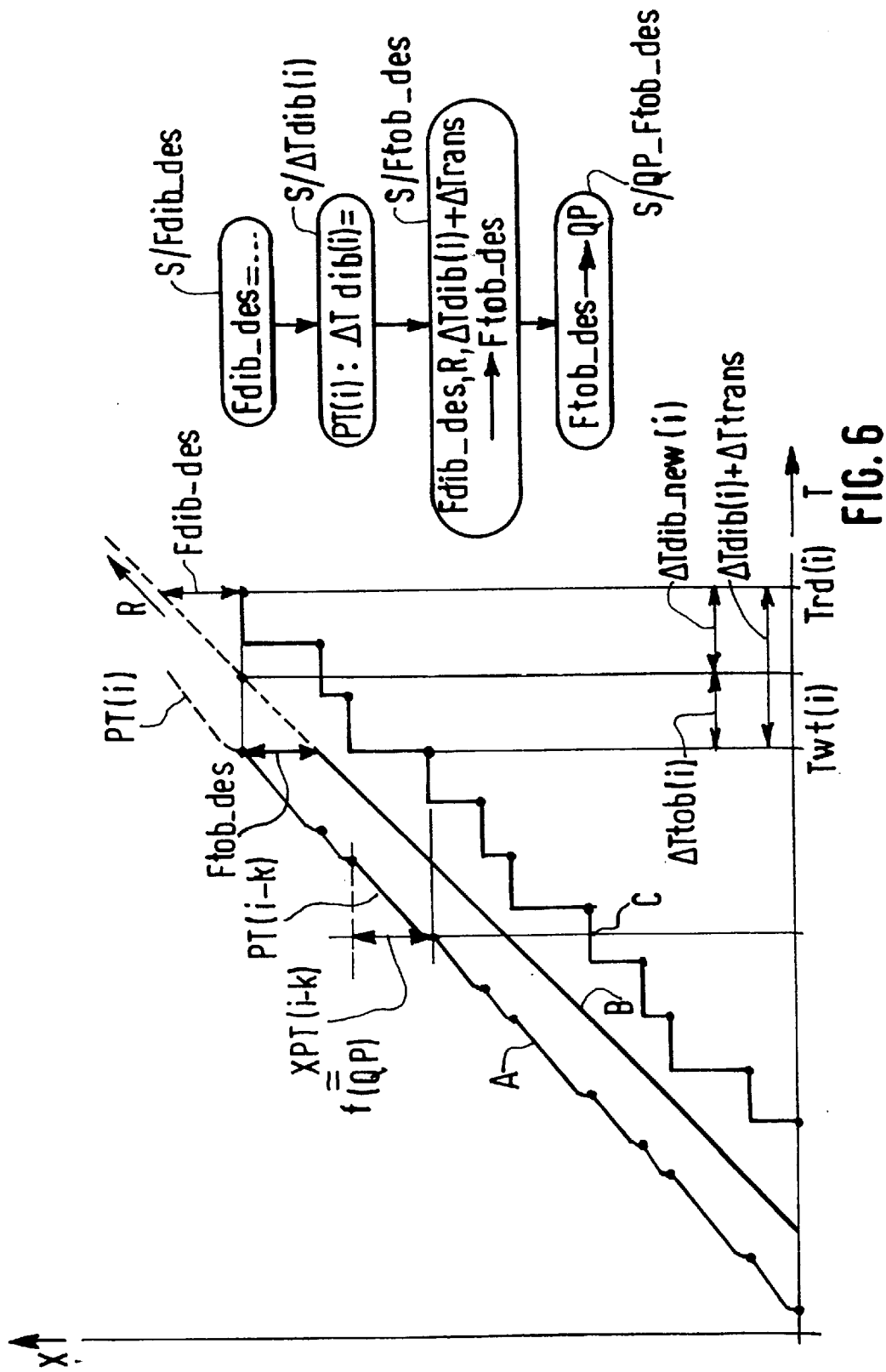

FIG. 6 illustrates the following features in addition to the features which have been discussed with reference to FIG. 2. A transcoded data portion PT(i–k) precedes the transcoded data portion PT(i) discussed with reference to FIG. 2. These data portions are hereinafter referred to as current transcoded data portion PT(i–k) and future transcoded data portion PT(i), respectively. In a step S/Fdib_des, a desired decoder input buffer fullness Fdib_des is defined. The desired decoder input buffer fullness Fdib_des is the amount of data B-C which the decoder input buffer DIB should preferably contain at the instant Trd(i) when the future transcoded data portion PT(i) is to be read from the decoder input buffer DIB. In a step S/ΔTdib(i), the decoder input buffer delay ΔTdib(i) associated with the future data portion P(i) is predicted. In a step S/Ftob_des, a desired transcoder output buffer fullness Ftob_des is calculated. The desired transcoder output buffer fullness Ftob_des is the amount of data A-B which the transcoder buffer TOB should preferably contain at the instant Twt(i) when the future transcoded data portion is to be written in the transcoder output buffer TOB. The desired transcoder output buffer is calculated on the basis of the projected bitrate R for the transcoded data stream and the predicted decoder input buffer delay ΔTdib(i). In a step S/QP-Ftob_des, the quantization parameter QP determining the amount of data XPT (i–k) comprised in the current transcoded data portion PT(i–k) is adjusted on the basis of the desired transcoder output buffer fullness Ftob_des.

The following aspects have been taken into consideration with regard to the FIG. 6 features. It has already been mentioned that a satisfactory transcoding quality can be obtained if a coded data portion which comprises a relatively large amount of data is transcoded into a transcoded data portion which also comprises a relatively large amount of data. However, as discussed in connection with the features illustrated in FIG. 4, there is a risk of underflow when a relatively large transcoded data portion PT is to be read from the decoder input buffer DIB. That is, there is a risk that the relatively large transcoded data portion has not yet been fully written into the decoder output buffer DIB at this very instant. This risk is reduced if the features illustrated in FIG. 4 are applied, that is, if it is tried to keep the amount of data in the relatively large transcoded data portion below a critical value for which underflow may occur. In that case, avoiding underflow is the criterion for the amount of data to be comprised in the relatively large transcoded data portion whereas, preferably, one or more other criteria should apply such as the amount of data contained in the coded data portion from which the transcoded data portion in question is derived. It is thus desirable that the amount of data contained in decoder input buffer DIB remains within certain limits without any safeguard coming into action like the features illustrated in FIG. 4 or, at least, if there is a safeguard, it does not come into action too often.

The features illustrated in FIG. 6 provide the following advantageous effects. The quantization parameter QP and hence the amount of data XPT(i–k) comprised in the current transcoded data portion PT(i–k) are adjusted in such a way that the amount of data contained in the decoder input buffer for the future transcoded data portion PT(i) is at a desired level or at least sufficiently close to it. Thus, the features illustrated in FIG. 6 provide, as it were, a long-term strategy which prevents that, when the future transcoded data portion PT(i) is to be transcoded, short-term measures have to be taken, for example, in order to avoid an underflow in the decoder input buffer DIB. The future transcoded data portion PT(i) may be, for example, of a type which is known or expected to comprise a relatively large amount of data. In that case, the desired decoder input buffer fullness Fdib_des is preferably relatively high so as to allow the future transcoded data portion PT(i) to contain a relatively large amount of data. Accordingly, this reduces the chance that any safeguard like the features illustrated in FIG. 4 comes into action. The features illustrated in FIG. 6 thus provide an element of anticipation to the adjustment of the quantization parameter QP which contributes to a satisfactory transcoding quality.

Figure 7:
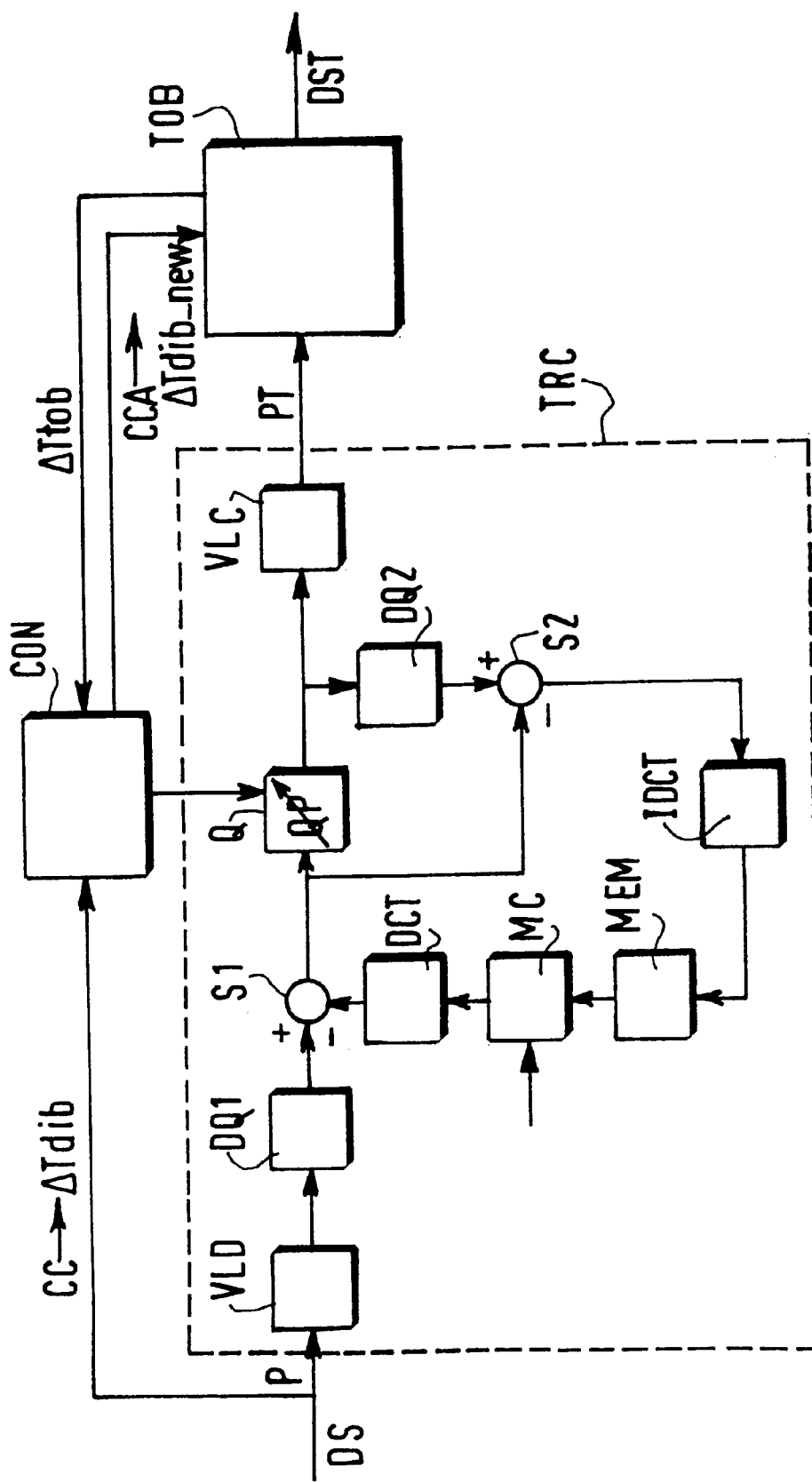
FIG. 7 is a block diagram of an example of a transcoder in accordance with the invention.

FIG. 7 illustrates an example of a transcoder in accordance with the invention, in which any of the features discussed hereinbefore with reference to FIGS. 1 to 6 may be implemented, either individually or in combination. The data stream DS received by the FIG. 7 transcoder may be of the MPEG type representing a sequence of pictures in which each coded data portion P represents a different picture. The transcoded data stream DST may equally be of the MPEG type in which each transcoded data portion PT represents the same picture as the coded data portion P from which it was obtained. The transcoded data stream DST may have a lower bit-rate than the data stream DS. In that case, the FIG. 7 transcoder carries out a bitrate conversion.

The FIG. 7 transcoder comprises the transcoder output buffer memory TOB mentioned hereinbefore and, in addition, a transcoding circuit TRC and a controller CON. The transcoding circuit TRC comprises a variable-length decoder VLD, a variable-length coder VLC, a quantizer Q two de-quantizers DQ1, DQP, a discrete-cosine transformer DCT, an inverse discrete-cosine transformer IDCT, a memory MEM, a motion compensator MC, and two subtracters S1, S2. A transcoding circuit identical to the transcoding circuit TRC is described in greater detail in EP-A 0 690 392.

The transcoding circuit TRC transcodes coded data portions P into transcoded data portions PT. The amount of data comprised in a transcoded data portion is determined by the quantization parameter QP of the quantizer Q. Both the coded data portion P and the transcoded data portions PT comprise quantized DCT coefficients. The quantizer QP effectively re-quantizes DCT coefficients which have first been quantized at a coding end and then de-quantized by the de-quantizer DQ1. The quantization of a DCT coefficient with a certain value of the quantization parameter QP means that the value of the DCT coefficient is divided by the value of the quantization parameter QP and then rounded off to the nearest possible integer. For example, let it be assumed that a DCT coefficient may assume any integral value between −128 and 127. In that case, 8 bits are required to represent the DCT coefficient in a binary form. If the quantizer Q quantizes the DCT coefficient with a quantization parameter 4, a quantized DCT coefficient will be obtained which may assume any integral value between −32 and 31. In that case, only 6 bits are required to represent the quantized DCT coefficient. However, if the quantizer Q quantized the DCT coefficient with a quantization parameter 8, a quantized DCT coefficient would be obtained which may assume any integral value between −16 and 15. In that case, only 5 bits are required to represent the quantized DCT coefficient.

The controller CON effectively carries out the steps which have been described in connection with any of the features illustrated in FIGS. 1 to 6. To that end, the controller receives parameters from the coded data stream DS such as decoder input buffer delays ΔTdib defined by the control codes CC in the coded data stream DS. It should be noted that the control codes CC correspond to what is referred to as "vbv buffer delay" in MPEG standards. The controller CON may also receive one or more parameters from the transcoder output buffer TOB relating to the amount of data which is comprised in this buffer or the transcoder output buffer delay ΔTtob or both. Furthermore, the controller CON may determine or have knowledge of the projected bitrate R of the transcoded data stream DST. On the basis of such parameters which the controller CON receives or are available in the controller CON, it calculates a new decoder input buffer delay ΔTdib_new for transcoded data portions PT. The controller CON may also adjust the quantization parameter on the basis of one or more algorithms in accordance with the features described in connection with FIGS. 3 to 6. The controller CON may be in the form of a suitably programmed computer.

There are various manners in which the controller CON may adjust the quantization parameter QP. One example will now be described. For a picture which has been transcoded, the controller CON calculates the product of (1) the quantization parameter QP it has applied and (2) the amount of transcoded data which has been obtained, for example in terms of number of output bits. This product will hereinafter be referred to as the complexity of the picture. The complexity is a measure of how difficult it is, as it were, to code the picture. The picture can be considered difficult to code if the quantization parameter QP has a relatively high value, implying that the DCT coefficients are expressed using relatively few bits and that relatively many DCT coefficients should be rounded of to '0', but nevertheless a relatively large amount of transcoded data has been obtained. In that case, the complexity, which is the product of the quantization parameter QP and the amount of data which has been obtained, will have a relatively high value thus indicating that the picture is difficult to code.

Let is be assumed that a picture of a certain coding type I, P or B is to be transcoded. A basic value for the quantization parameter QP to be applied in transcoding the picture is calculated as follows. The basic value is the complexity of the last transcoded picture of the same coding type I, P or B, respectively, divided by a picture target. The picture target is the amount of data which should ideally be obtained by transcoding the picture. It may be defined in various manners. Two examples will be given hereinafter, one is a short-term approach, the other a long-term approach It should be noted that the basic value for the quantization parameter QP is, in effect, determined on the basis of previous coding experiences based. It is assumed that the respective complexities of two subsequent pictures will not differ much. This assumption is correct in most cases.

The picture target, which is used to calculate the basic value for the quantization parameter QP, may be defined as follows. It is calculated what the decoder input buffer fullness will be at the instant just before the transcoded data of the picture will be read from the decoder input buffer. Referring to FIG. 3, with PT(i) representing the transcoded data of the picture, the decoder input buffer fullness Fdib is calculated on the basis of the transcoder output buffer fullness Ftob and the projected bitrate R in the time span between Twt and Trd, the length of this time span being ΔTdib+ΔTtrans. It is defined what the decoder input buffer fullness should be just after the transcoded data of the picture will have been read from the decoder input buffer. Referring to FIG. 3, it is defined what the difference between curves B and C should be just after the instant Trd, this difference being the desired decoder input buffer fullness. The picture target is then the difference between the decoder buffer fullness Fdib and the desired decoder buffer fullness. Such a manner of determining the picture target may be described as follows. Before a picture is transcoded, it is determined "where are we?" and "where do we want to be?" in terms of decoder input buffer fullness. The difference between these two is the picture target.

It is possible to define a fixed desired decoder input buffer fullness for each picture, whereby a distinction between coding types I, P and B may be made, and to calculate the picture target as described hereinbefore. This can be regarded as an approach using a short-term target, the short term corresponding to the duration of a picture. However, a better picture quality will generally be obtained if an approach is used which is based on a long-term target, the long term corresponding to a sequence of N pictures, N being an integer This allows flexibility in picture targets in the sense that a higher picture target can be assigned for a picture in the sequence of N pictures which is relatively complex, at the expense of the picture targets for the other pictures in the sequence. Accordingly, a more even picture quality can be obtained.

The following is an example of an approach which uses a long-term target. A desired decoder input buffer fullness is defined for a future instant. The future instant is the instant just after the N-th picture following the previously transcoded picture, will have been read from the decoder input buffer. Thus, if N were 1, the future instant would be the instant just after the picture currently to be transcoded will have been read from the decoder input buffer. However, if N were 1, this would correspond to the approach using a short-term target as described hereinbefore. The integer N preferably corresponds to the number of pictures contained in a group of pictures such as defined in MPEG. For example, N may be 12.

The aforementioned future instant can be calculated on the basis of the decoder input buffer delay $\Delta Tdib$ as defined by the "vbv buffer delay" associated to the picture currently to be transcoded. Let it be assumed that "now" is the instant just before the picture currently to be transcoded is written into the transcoder output buffer. Referring to FIG. 3, with PT(i) being the picture currently to be transcoded, "now" is the instant Twt. The future instant is the end of a time span which starts at "now", the time span having a length which is the sum of decoder input buffer delay $\Delta Tdib$ and the transcoding delay $\Delta Trans$ plus N−1 picture periods. Thus, the future instant is "now" plus $\Delta Tdib$ plus $\Delta Trans$ plus N−1 times $\Delta Tpt$, $\Delta Tpt$ being the picture period. The sum of decoder input buffer delay $\Delta Tdib$ and the transcoding delay $\Delta Ttrans$ marks the instant when the first picture of the N pictures is read from the decoder input buffer. Consequently, since a picture is read from the decoder input buffer each picture period, the Nth picture will be read N−1 picture periods after the first picture is read.

A group target for the N subsequent pictures to be transcoded is calculated on the basis of the aforementioned time span, the projected bitrate for the transcoded data stream during this time span, the actual transcoder output buffer fullness and the desired decoder input buffer fullness at the aforementioned future instant. The group target represents the amount of data which should ideally be obtained by transcoding the subsequent N pictures. That is, if the group target were met, the decoder input buffer fullness would be the desired decoder input buffer fullness at the future instant.

The group target is calculated as follows. The amount of data which will be transferred from the transcoder output buffer to the decoder input buffer during the aforementioned time span, is calculated on the basis of the projected bitrate. The group target is the aforementioned amount of data minus the actual transcoder output buffer fullness and minus the desired decoder input buffer fullness. For example, let it be assumed that the bitrate in the time span concerned will be constant and equal to R. Then, the amount of data which will be transferred from the transcoder output buffer to the decoder input buffer during the time span, is R times the length of the time span. Thus, the group target is R times the length of the time span minus the actual transcoder output buffer fullness and minus the desired decoder input buffer fullness.

The picture target for the picture to be transcoded is calculated on the basis of the aforementioned group target in the following manner. A sum of the complexities of the last N transcoded pictures is calculated first. The picture target is the complexity of the last transcoded picture having the same coding type as the picture to be transcoded, multiplied by the group target and divided by the sum of complexities. Thus, if a recent transcoded picture was relatively complex, meaning that its complexity has a high value, a subsequent picture to be transcoded having the same coding type will have a relatively high picture target.

It should be noted that the picture target presented several paragraphs before, does not take into account picture complexity but is directly derived from an actual buffer fullness and a desired buffer fullness within a short term, i.e. the next picture. Thus, this short-term based picture target is, as it were, rigid compared with the long-term based picture target presented in the preceding paragraph. The long-term based picture target presented in the preceding paragraph takes into account, as it were, that some pictures may be more complex than others and, consequently, that they should be allowed to produce more bits when transcoded at the expense of other pictures. Accordingly, it can be prevented that the quantization parameter QP suffers from relatively large short-term fluctuations which is not beneficial to the picture quality.

Advantageously, the long-term based picture target is verified to be sure that the decoder input buffer will neither underflow nor overflow if the amount of data obtained by transcoding the picture were indeed equal to this picture target. FIGS. 4 and 5 illustrate verification methods for overflow and underflow, respectively. If the picture target were to cause underflow, it is decreased in order to prevent underflow. Conversely, if the picture target were to cause overflow, it is increased in order to prevent underflow. The basic value for the quantization parameter QP is obtained by dividing the complexity of the last transcoded picture of the same coding type by the picture target which has been verified.

The basic value of the quantization parameter QP may be applied for each macroblock in the picture to be transcoded. However, it will generally be advantageous in terms of picture quality to adjust the quantization parameter's value macroblock by macroblock. This can be done in the following manner. The MPEG data stream comprises control codes indicating, for each macro block, the value of the quantization parameter which was used for encoding the macroblock. This value, which will hereinafter be referred to as the original value, is used for deriving a correction coefficient. Thus, a correction coefficient is derived for each macroblock. The value of the quantization parameter QP to be applied for transcoding a macroblock, is the basic value of the quantization parameter QP times the correction coefficient for the macroblock.

The correction coefficient may be calculated in the following manner. Each original value is divided by a weighing factor depending on the coding type of the macroblock concerned so as to obtain weighed original values. The mean of the weighed original values of the last transcoded picture is calculated so as to obtain a mean original value. The correction coefficient is the ratio of twice the current original value plus the mean original value and the current original value plus twice the mean original value.

The various aspects of determining a value for the quantization parameter QP described hereinbefore and with reference to FIGS. 3–7, have the following feature in common. The decoder input buffer delay ΔTdib associated with a data portion PT to be transcoded, is used to determine the quantization parameter QP for transcoding that data portion PT. Thus, in transcoding an MPEG data stream, the vbv buffer delay associated with a coded picture is used to determine the quantization parameter QP for transcoding that picture. The reason for doing so can be understood from FIG. 3 for example. The larger the input buffer delay ΔTdib, the fuller the decoder input buffer will be (Fdib larger) just before the data portion concerned is read from the decoder input buffer and vice versa. Since the input buffer delay ΔTdib is used to determine the quantization parameter QP, it can thus be prevented that the decoder input buffer will exceed an upper limit (overflow) or will be below a lower limit (underflow). Furthermore, in a long-term approach aiming at a desired decoder buffer fullness when an N-th subsequent data portion will be read from the decoder input buffer, the input buffer delay ΔTdib can be used to calculate a desired amount of transcoded data to be obtained in coding the N subsequent data portions. An appropriate value for the quantization parameter QP can be derived from that desired amount of data.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements as different blocks, this by no means excludes the implementation of some functional elements or all functional elements as a single physical unit.

In the claims, any reference sign between parentheses shall not be construed as limiting the claim concerned.

What is claimed is:

1. A method of transcoding a data stream (DS) comprising a time multiplex of coded data (D) and control data (C), the method comprising the step of transcoding (T) the coded data (D) so as to obtain transcoded data (DT) which differs in size from the coded data (D), adapting (A) the control data (C) for the transcoded data (DT) so as to obtain adapted control data (CA) which is substantially equal in size to the control data (C);

writing the transcoded data (DT) and the adapted control data (CA) in a transcoder output buffer (TOB); and reading the transcoded data (DT) and the adapted control data (CA) from the transcoder output buffer (TOB) so as to obtain a transcoded data stream (DST), wherein the data stream (DS) comprises control codes (CC), a control code (CC) defining a decoder input buffer delay (ΔTdib) for a coded data portion (P) associated therewith, the input buffer delay (ΔTdib) being the difference between an instant (Twd1) when the coded data portion (P) is written into a decoder input buffer (DIB1) and an instant (Trd1) when the coded data portion (P) is to be read from the decoder input buffer (DIB1), calculating a transcoder output buffer delay (ΔTtob) being the difference between an instant (Twt) when a transcoded data portion (PT) obtained by transcoding the coded data portion (P) is written into the transcoder output buffer (TOB), and an instance (Trt) when the transcoded data portion (PT) is read from transcoder output buffer (TOB);

calculating a new decoder input buffer delay (ΔTdib_new) which is substantially equal to the sum of the decoder input buffer delay (ΔTdib) and a transcoding delay (ΔTtrans) minus the transcoder output buffer delay (ΔTtob); and providing, for the transcoded data portion (PT), an adapted control code (CCA) which defines the new decoder input buffer delay (ΔTdib_new).

2. A method as claimed in claim 1, characterized in that the method comprises the steps of:

calculating a transcoder output buffer fullness (Ftob) being the amount of data (A-B) contained in the transcoder output buffer at the instant (Twt) when the transcoded data portion (PT) is written into the transcoder output buffer (TOB);

calculating a decoder input buffer fullness (Fdib) being the amount of data (BC) which will be contained in a decoder input buffer receiving the transcoded data stream at an instant (Trd) when the transcoded coded data portion (PT) is to be read from the decoder input buffer, the decoder input buffer fullness (Fdib) being calculated on the basis of the transcoder output buffer fullness (Ftob), a projected bitrate (R) for the transcoded data stream, and the sum of the decoder input buffer delay (ΔTdib) and the transcoding delay (ΔTtrans); and adjusting a quantization parameter (QP) determining the amount of data (XPT) which will be comprised in the transcoded data portion (PT) in dependence on the decoder input buffer fullness (Fdib).

3. A method as claimed in claim 2, characterized in that the method comprises the steps of:

determining a target (Ttarget) for the amount of data (XPT) to be comprised in the transcoded data portion (PT);

verifying if the target (Ttarget) exceeds the input decoder buffer fullness (Fdib) and, if so, reducing the target (Ttarget) so as to obtain a verified target (Ttarget_ver) which does not exceed the decoder input buffer fullness (Fdib);

adjusting the quantization parameter (QP) on the basis of the verified target (Ttarget).

4. A method as claimed in claim 1, wherein there is a fixed time interval (ΔTpt) between instancts when successive transcoded data portions (PT) are to be read from a decoder input buffer receiving the transcoded data stream, characterized in that the method comprises the steps of:

determining a target (Ttarget) for the amount of data (XPT) to be comprised in the transcoded data portion (PT);

calculating a transcoder output buffer fullness (Ftob) being the amount of data (A-B) contained in the transcoder output buffer (TOB) at the instant (Twt(i)) when the transcoded data portion (PT) is written into the transcoder output buffer (TOB);

calculating a subsequent decoder input buffer fullness (Fdib_next) being the amount of data (B-C) which will be contained in the decoder input buffer at an instant (Trd(i+1)−δ) just before a subsequent transcoded coded data portion PT(i+1) is to be read from the decoder input buffer, the next decoder input buffer fullness (Fdib_next) being calculated on the basis of the target (Ttarget), the transcoder buffer fullness (Ftob), a projected bit-rate (R) for the transcoded data stream, and the sum of the decoder input buffer delay (ΔTdib), the transcoding delay (ΔTtrans) and the fixed time interval (Tpt);

verifying if the next decoder input buffer fullness (Fdib_next) exceeds a predefined maximum (MAX) and, if so, increasing the target (Ttarget) so as to obtain a verified target (Ttarget_ver) for which the next decoder input buffer fullness (Fdib_next) does not exceed the predefined maximum MAX;

adjusting the quantization parameter (QP) determining the amount of data (XPT) comprised in the transcoded data portion (PT) on the basis of the verified target (Ttarget_ver).

5. A method as claimed in claim 1, wherein a transcoded data portion precedes the transcoded data portion mentioned in claim 1, these data portions being hereinafter referred to as current transcoded data portion (PT(i−k)) and future transcoded data portion (PT(i)), respectively, characterized in that the method comprises the steps of:

defining a desired decoder input buffer fullness (Fdib_des) being the amount of data (B-C) which the decoder input buffer should preferably contain at the instant (Trd(i)) when the future transcoded data portion (PT(i)) is to be read from the decoder input buffer;

predicting the decoder input buffer delay (ΔTdib) associated with the future data portion (PT(i−k));

calculating a desired transcoder output buffer fullness (Ftob_des) being the amount of data (A-B) which the transcoder buffer should preferably contain at the instant (Twt(i)) when the future transcoded data portion (PT(i)) is to be written in the transcoder output buffer; the desired transcoder output buffer fullness (Ftob_des) being calculated on the basis of the projected bit-rate (R) for the transcoded data stream and sum of the predicted decoder input buffer delay (ΔTdib) and the transcoding delay (ΔTtrans); and adjusting the quantization parameter (QP) determining the amount of data XPT(i−k) comprised in the current transcoded data portion (XPT(i−k)) on the basis of the desired transcoder output buffer fullness (Ftob_des).

* * * * *

UNITED STATES PATENT AND TRADEMARK OFFICE
CERTIFICATE OF CORRECTION

PATENT NO.    : 6,201,844 B1
DATED         : March 13, 2001
INVENTOR(S)   : Nicolas Bailleul It is certified that error appears in the above-identified patent and that said Letters Patent is hereby corrected as shown below:

<u>Column 14,</u>
Line 50, change "instancts" to -- instants --.

Signed and Sealed this

Third Day of September, 2002

Attest:

Attesting Officer

JAMES E. ROGAN
*Director of the United States Patent and Trademark Office*